United States Patent
Endo

(10) Patent No.: US 9,106,824 B2
(45) Date of Patent: Aug. 11, 2015

(54) IMAGING APPARATUS AND DRIVING METHOD SELECTING ONE OF A PHASE DIFFERENCE AF MODE AND A CONTRAST AF MODE

(71) Applicant: FUJIFILM Corporation, Tokyo (JP)

(72) Inventor: Hiroshi Endo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/040,227

(22) Filed: Sep. 27, 2013

(65) Prior Publication Data

US 2014/0028895 A1 Jan. 30, 2014

Related U.S. Application Data

(63) Continuation of application No. PCT/JP2011/077708, filed on Nov. 30, 2011.

(30) Foreign Application Priority Data

Mar. 31, 2011 (JP) .................. 2011-080898

(51) Int. Cl.
*H04N 5/232* (2006.01)
*H04N 5/369* (2011.01)

(52) U.S. Cl.
CPC ......... *H04N 5/23212* (2013.01); *H04N 5/3696* (2013.01)

(58) Field of Classification Search
CPC ............ H04N 5/23212; H04N 5/3696; H04N 5/23229; H04N 7/18; G03B 13/36
USPC .................. 348/345, 346, 348, 354
See application file for complete search history.

(56) References Cited

U.S. PATENT DOCUMENTS

| 8,730,380 | B2* | 5/2014 | Uchida | 348/349 |
| 2004/0100573 | A1* | 5/2004 | Nonaka | 348/345 |
| 2005/0185086 | A1* | 8/2005 | Onozawa | 348/349 |
| 2008/0259202 | A1* | 10/2008 | Fujii | 348/345 |
| 2009/0092386 | A1 | 4/2009 | Kishimoto et al. | |
| 2010/0302432 | A1 | 12/2010 | Komuro | |
| 2010/0302433 | A1 | 12/2010 | Egawa | |

(Continued)

FOREIGN PATENT DOCUMENTS

| JP | 2006-30470 A | 2/2006 |
| JP | 2009-36987 A | 2/2009 |

(Continued)

OTHER PUBLICATIONS

International Search Report issued in PCT/JP2011/077708 mailed Mar. 13, 2012.

*Primary Examiner* — Twyler Haskins
*Assistant Examiner* — Carramah J Quiett
(74) *Attorney, Agent, or Firm* — Birch, Stewart, Kolasch & Birch, LLP

(57) ABSTRACT

An imaging apparatus with a solid-state imaging device having phase difference detection pixels arranged on a light receiving surface acquires the size of a main subject image by identifying the main subject image picked on the light receiving surface of the solid-state imaging device, sets an AF region subjected to autofocus processing in accordance with an image size, and selects a phase difference AF mode (step S32) or a contrast AF mode (step S31) depending on whether the image size is larger than a required size (step S23) as a mode used for the autofocus processing.

12 Claims, 11 Drawing Sheets

(56) References Cited

U.S. PATENT DOCUMENTS

| | | |
|---|---|---|
| 2011/0013894 A1* | 1/2011 | Takaiwa .................. 396/48 |
| 2011/0025904 A1 | 2/2011 | Onuki et al. |
| 2011/0037888 A1 | 2/2011 | Onuki |

FOREIGN PATENT DOCUMENTS

| | | |
|---|---|---|
| JP | 2009-63921 A | 3/2009 |
| JP | 2009-92824 A | 4/2009 |
| JP | 2009-105358 A | 5/2009 |
| JP | 2009-157062 A | 7/2009 |
| JP | 2009-217074 A | 9/2009 |
| JP | 2009-217252 A | 9/2009 |
| JP | 2009-244854 A | 10/2009 |
| JP | 2010-113297 A | 5/2010 |
| JP | 2010-204294 A | 9/2010 |
| JP | 2010-276712 A | 12/2010 |

* cited by examiner

IMAGING APPARATUS AND DRIVING METHOD SELECTING ONE OF A PHASE DIFFERENCE AF MODE AND A CONTRAST AF MODE

CROSS REFERENCE TO RELATED APPLICATION

This is a continuation of International Application No. PCT/JP2011/077708 filed on Nov. 30, 2011, and claims priority from Japanese Patent Application No. 2011-080898, filed on Mar. 31, 2011, the entire disclosures of which are incorporated herein by reference.

TECHNICAL FIELD

The present invention relates to an imaging apparatus mounted with a solid-state imaging device having a phase difference detection pixel on a light receiving surface and a driving method thereof.

BACKGROUND ART

FIG. 11 is a diagram illustrating an example of a subject and five large flowers are present among thick leaved trees. When the subject is photographed by imaging apparatuses such as a digital cameral, an AF region 1 is set, for example, so that a large flower at the center of a screen is focused.

When the AF region 1 is set to have a range wider than the flower at the center, a plurality of minute leaves 2 having the minute background enters the AF region 1. The leave 2 having the minute background is a high-frequency subject having a high contrast. As a result, when an area ratio of the high-frequency subject 2 to the AF region 1 is high, the background is focused, and as a result, a so-called image of a back focus is picked up.

Therefore, in Patent Literature 1 below, zoom-in is performed to be close to the subject and when a zoom-in magnification is low, the AF region 1 is narrowed to an AF region 3 to take a countermeasure for the back focus.

However, when the AF region 1 is narrowed to the AF region 3 by applying a technology disclosed in Patent Literature 1 to a solid-state imaging device (for example, Patent Literature 2 below) having a phase difference detection pixel (also referred to as a pixel for focus detection) among a plurality of pixels (electrophoretic conversion devices: photodiodes) 2D-arranged on a light receiving surface, AF precision may deteriorate.

CITATION LIST

Patent Literature

Patent Literature 1: JP-A-2009-92824
Patent Literature 2: JP-A-2009-105358

SUMMARY OF INVENTION

Technical Problem

A method of adjusting a focus of a photographing lens by automatically detecting a distance up to a subject primarily includes two modes of a phase difference AF mode and a contrast AF mode, and both have advantages and disadvantages, respectively. As compared with the contrast AF mode, in the phase difference AF mode, since a time up to adjusting the focus can be shorter, the phase difference AF mode is strong at a shutter chance, and as a result, photographing by the phase difference AF mode is highly requested.

However, when the phase difference AF mode is continuously adopted, AF precision of the phase difference AF mode may not be acquired in the relationship between the size of an image of a main subject and the size of an AF region as described above, and as a result, a focus blurring image in which a main subject is not focused is picked up.

An object of the present invention is to provide an imaging apparatus capable of picking up a subject image in which a main subject is focused and a driving method thereof.

Solution to Problem

An imaging apparatus of the present invention is characterized by comprising: a solid-state imaging device having phase difference detection pixels arranged on a light receiving surface; a size identification unit configured to acquire an image size of a main subject image by identifying the main subject image picked up on the light receiving surface of the solid-state imaging device; an AF region setting unit configured to set an AF region subjected to an autofocus processing in accordance with the image size; and an AF mode selecting unit configured to select a phase difference AF mode when the image size is larger than a required size and select a contrast AF mode when the image size is smaller than the required size, as a mode used for the autofocus processing.

An driving method of an imaging apparatus which comprises a solid-state imaging device having phase difference detection pixels arranged on a light receiving surface of the present invention, is characterized by comprising: acquiring an image size of a main subject image by identifying the main subject image picked up on the light receiving surface of the solid-state imaging device; setting an AF region subjected to an autofocus processing in accordance with the image size; and selecting a phase difference AF mode when the image size is larger than a required size and select a contrast AF mode when the image size is smaller than the required size, as a mode used for the autofocus processing.

Advantageous Effects of Invention

According to the present invention, a main subject is not focused, but a background is focused, and as a result, a situation in which a focus of a picked-up image is blurred can be prevented.

DESCRIPTION OF EMBODIMENTS

Hereinafter, embodiments of the present invention will be described with reference to the accompanying drawings.

Figure 1:
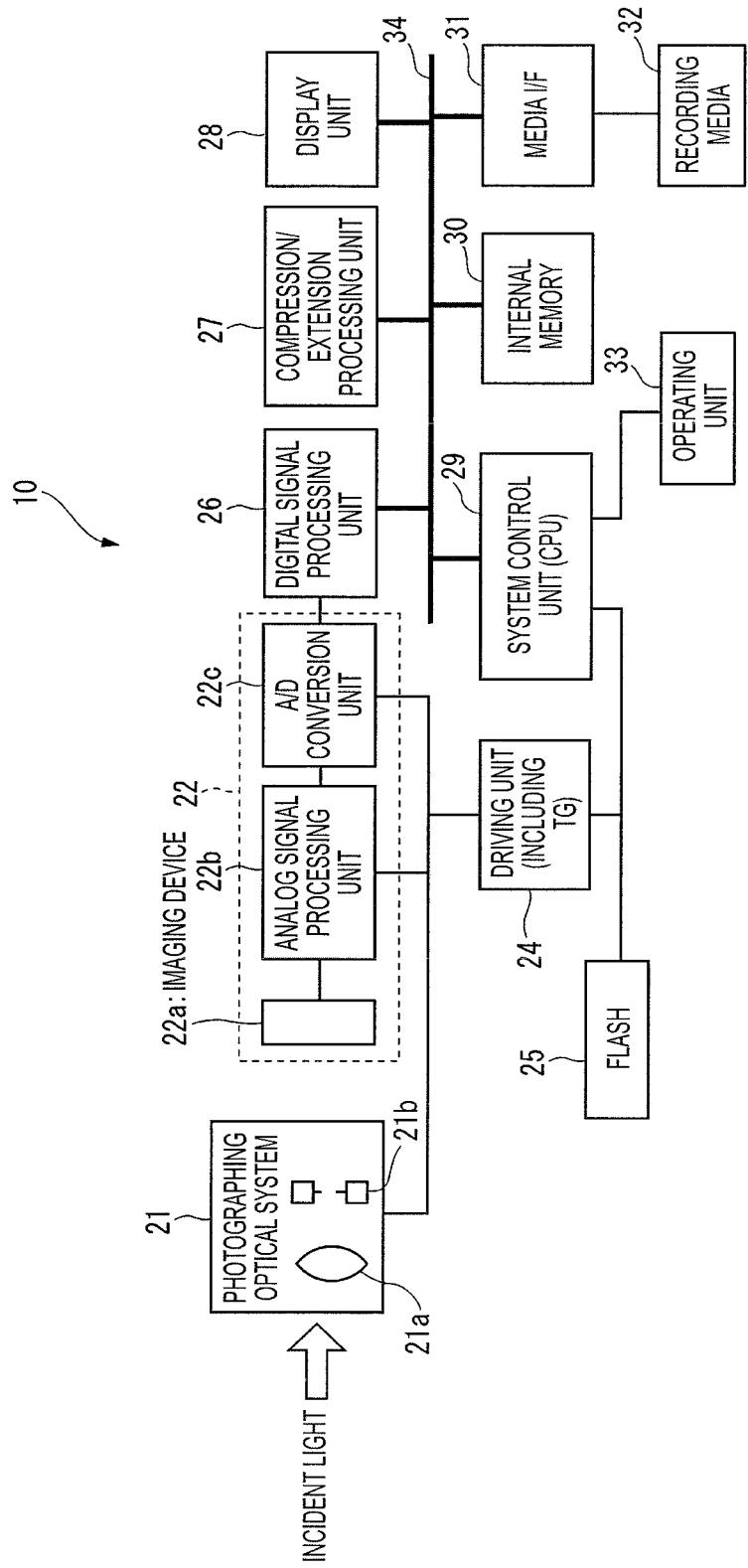
FIG. 1 is a functional block diagram of an imaging apparatus according to an embodiment of the present invention.

FIG. 1 is a functional block diagram of a digital camera (imaging apparatus) according to an embodiment of the present invention. The digital camera 10 includes a photographing optical system 21 including a photographing lens 21a or an aperture 21b and an imaging device chip 22 disposed on a rear end of the photographing optical system 21.

The imaging device chip 22 includes a single-plate type solid-state imaging device 22a for picking up a color image such as a CCD type or a CMOS type as a signal reading means, an analog signal processing unit (AFE) 22b performing analog processing such as automatic gain control (AGC) or correlation dual sampling of analog image data output from the solid-state imaging device 22a, and an analog/digital converting unit (A/D) 22c converting the analog image data output from the analog signal processing unit 22b into digital image data. In the embodiment, the CMOS type is exemplified as the solid-state imaging device 22a.

The digital camera 10 includes a driving unit (including a timing generator (TG)) 24 controlling driving of the solid-state imaging device 22a, the analog signal processing unit 22b, and the A/D 22c by an instruction from a system control unit (CPU) 29 to be described below and a flash 25 emitting light by the instruction from the CPU 29. The driving unit 24 may be mounted in the imaging device chip 22 together.

The digital camera 10 of the embodiment further includes a digital signal processing unit 26 performing known image processing such as acquisition or interpolation processing or white balance correction, RGB/YC conversion processing, and the like of the digital image data output from the A/D 22c, a compression/extension processing unit 27 compressing image data into image data such as a JPEG format, or on the contrary, extending the image data, a display unit 28 displaying a menu, and the like or a through image or a picked-up image, the system control unit (CPU) 29 integrally controlling the entire digital camera, an internal memory 30 such as a frame memory, or the like, a media interface (I/F) unit 31 performing interface-processing with a recording media 32 storing JPEG image data, and the like, and a bus 34 connecting them to each other. An operating unit 33 that inputs an instruction from a user is connected to the system control unit 29.

Figure 2:
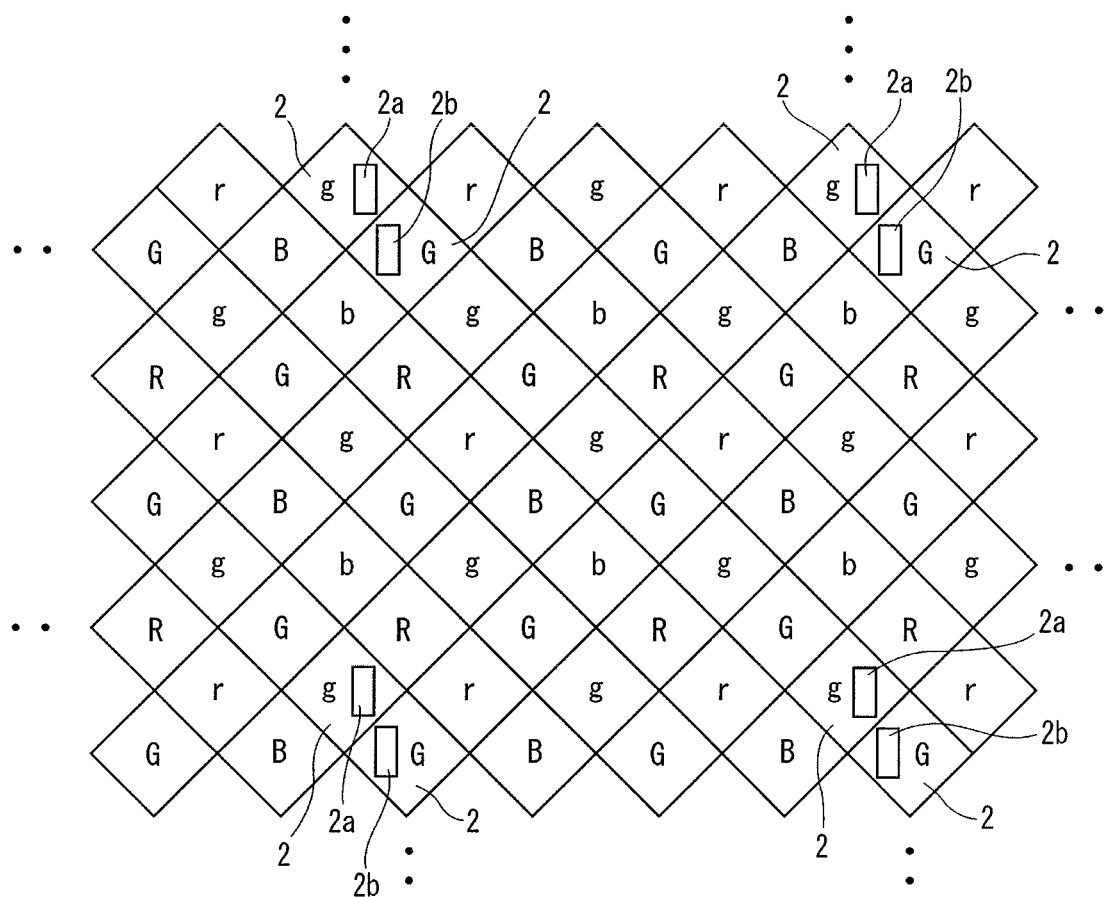
FIG. 2 is a surface schematic view of a solid-state imaging device illustrated in FIG. 1.

FIG. 2 is a surface schematic view of the solid-state imaging device 22a illustrated in FIG. 1 and illustrates a pixel array and a color filter array of the solid-state imaging device 22a. In the illustrated embodiment, a so-called honeycomb pixel array is provided, in which a even pixel row is disposed to be shifted from an odd pixel row (a square frame which is tilted at 45° represents each pixel and R (red), G (green), and B (blue) on each pixel represent colors of color filters) by ½ pixel pitch.

In the case of only each pixel of the even row, the pixel array becomes a square lattice array and three primary color filters RGB are Bayer-arrayed therein. In addition, in the case of only each pixel of the odd row, the pixel array becomes the square lattice array and three primary color filters rgb are Bayer-arrayed therein. R=r, G=g, and B=b, and the same-color pixels that are obliquely adjacent thereto form pair pixels. Light receiving areas of the respective pixels are the same as each other and the sizes of light blocking layer openings are also the same as each other (only phase difference detection pixels to be described below have the different light blocking layer openings). Further, microlenses (not illustrated) having the same shape in all pixels are mounted on the color filters.

In a pixel row of pixels in which G filters of the solid-state imaging device 22a illustrated in FIG. 2 are stacked (hereinafter, referred to as a G pixel, and the same is applied to R, B, r, g and b) and a pixel row of g pixels adjacent thereto, one pixel per four pixels is set as a phase difference detection pixel 2. In the phase difference detection pixel (a pair of G pixel and g pixel) 2, the light blocking layer opening 2a is smaller than a light blocking layer opening (not illustrated) of another general pixel and further, is installed to be eccentric to the right around the center of a g pixel 2. Further, a light blocking layer opening 2b is as large as the light blocking layer opening 2a and further, is installed to be eccentric to the left around the center of the G pixel 2.

Figure 3:
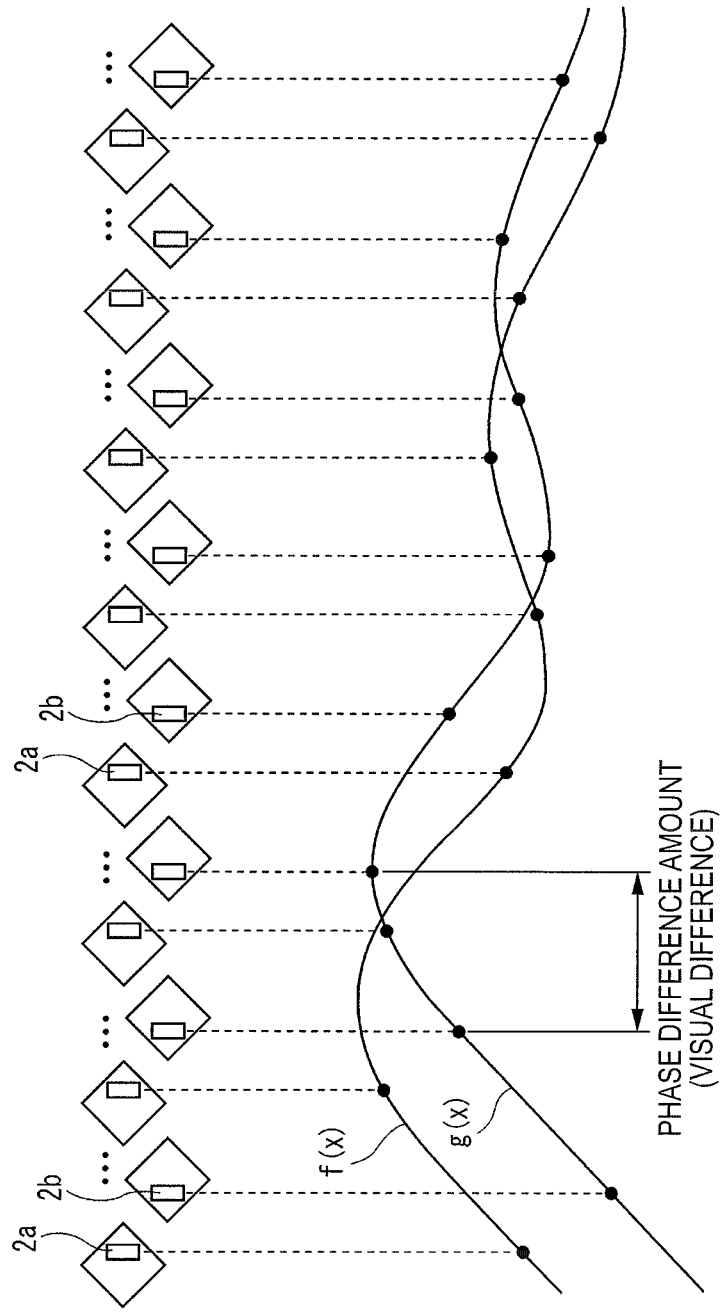
FIG. 3 is a diagram describing a detection principle of a phase difference amount detected by a phase difference detection pixel.

FIG. 3 is a diagram describing a principle of detecting a distance up to a subject with a phase difference detection pixel. The pair pixels of the phase difference detection pixel 2 are arranged in parallel at a predetermined interval (one pixel per four pixels in the example of FIG. 2) in the horizontal direction to acquire a signal f(x) acquired through the light blocking layer opening 2a and a signal g(x) acquired through the light blocking layer opening 2b.

The signal f(x) and the signal g(x) are acquired as a result of receiving incident light from the same subject on the same horizontal line, and become the same waveforms which deviate horizontally to each other and a deviation amount therebetween becomes a phase difference amount. The phase difference amount is a visual difference depending on a focus deviation amount and the focus deviation amount may be acquired form the phase difference amount.

Figure 11:
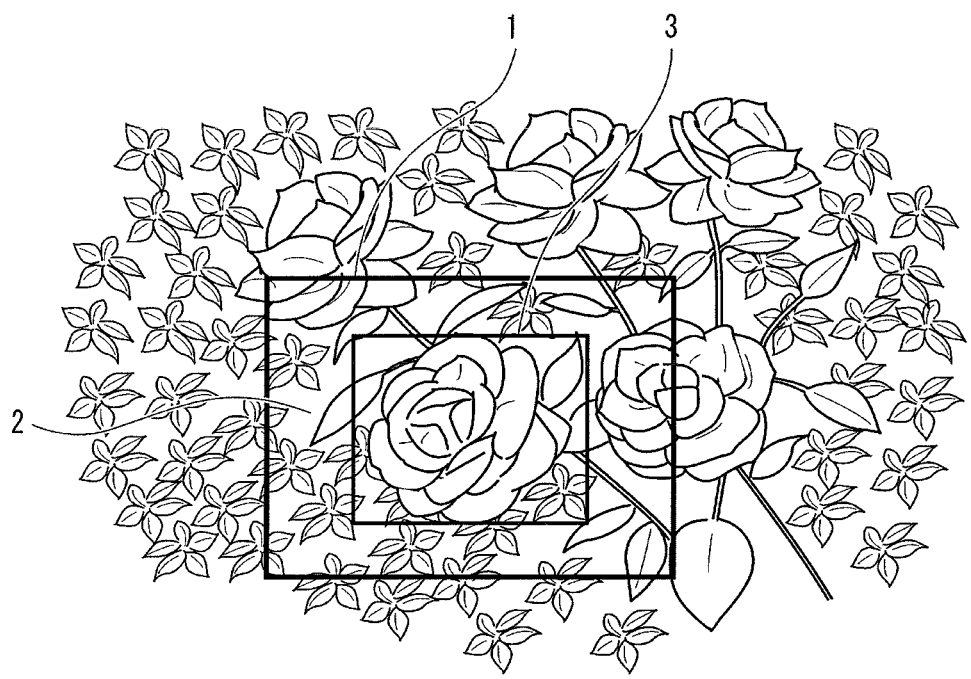
FIG. 11 is a diagram illustrating the relationship between a subject and an AF region.

In the case where the phase difference amount is acquired by a detection signal of the phase difference detection pixel, when the number of data of the signals f(x) and g(x) of FIG. 3 is small, an influence of noise is large, and as a result, the phase difference amount may not be precisely acquired. That is, the AF precision may not be acquired. As a result, a predetermined number of (for example, 100) phase difference detection pixels 2 are required in a horizontal direction. For example, in the case where one pixel per four horizontal pixels is set as the phase difference detection pixel 2, when a horizontal direction of an AF region 1 illustrated in FIG. 11 is narrowed to 400 pixels or less, the AF precision deteriorates, and as a result, it is difficult to pick up an image in which a main subject is focused.

In the embodiment, one pixel per four horizontal pixels is set as the phase difference detection pixel and as illustrated in FIG. 3, a graph f(x) by the detection signal of the phase difference detection pixel in which the light blocking layer opening 2a is close to the right side and a graph g(x) by the detection signal of the phase difference detection pixel in which the light blocking layer opening 2b is close to the left side are acquired and it is measured how two graphs deviate from each other to acquire a defocus amount (phase difference amount).

In this case, in order to compare the graphs, when there is no sampling point of a predetermined level or more, the graph is lost in noise. As a result, in the embodiment, an absolute number of phase difference detection pixels in the AF region, in particular, in the horizontal direction needs to be equal to or more than a threshold value. In addition, when the absolute number is equal to or more than the threshold value, the phase difference AF mode is adopted and when the absolute number is less than the threshold value, the contrast AF mode is adopted as described below.

Figure 4:
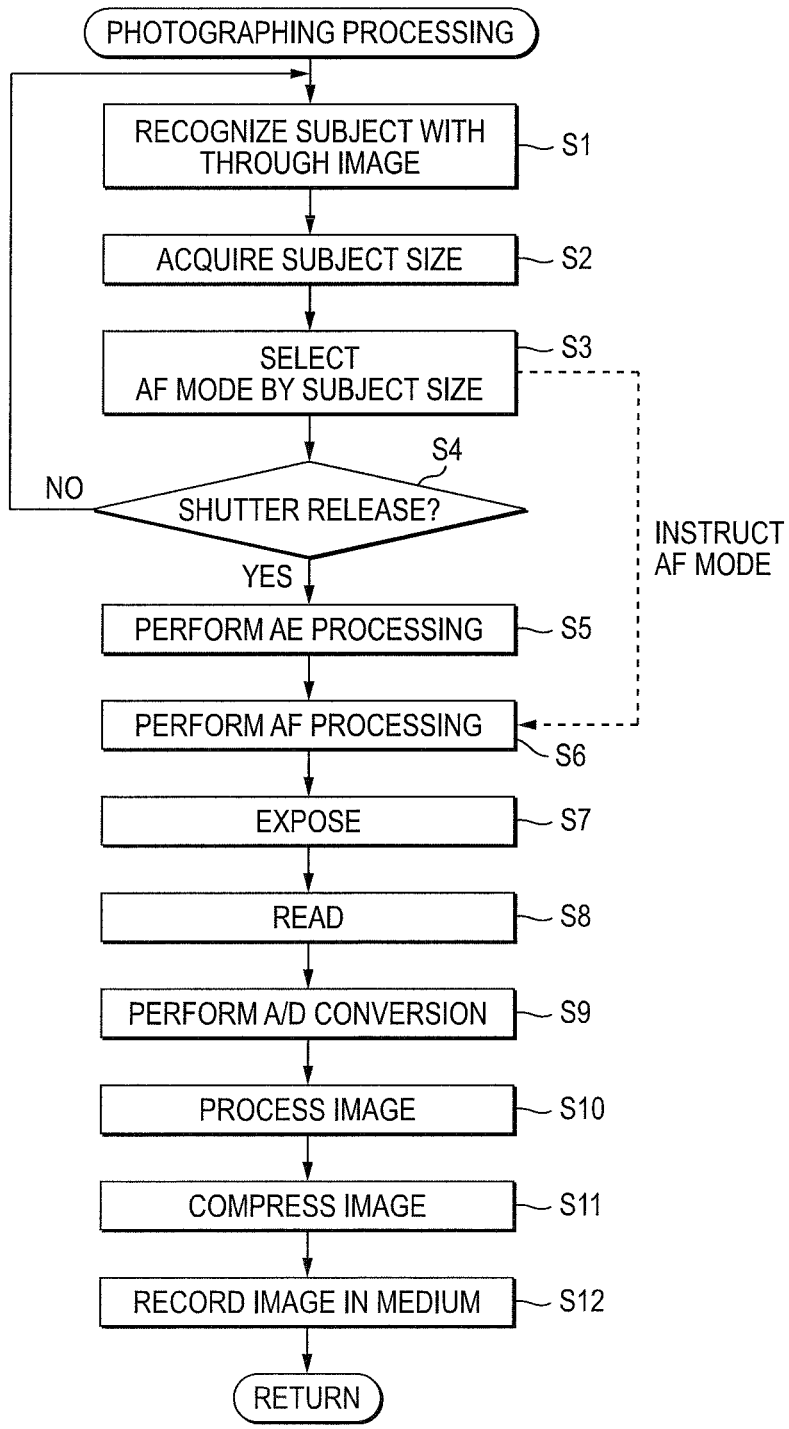
FIG. 4 is a flowchart illustrating an imaging processing sequence executed by a system control unit of FIG. 1.

FIG. 4 is a flowchart illustrating an imaging processing sequence executed by the system control unit 29 of FIG. 1. When the digital camera 10 is power-on (in a photographing mode), a picked-up image signal in a moving image state is continuously output as the through image in the solid-state imaging device 22a. The system control unit 29 gives an instruction to the digital signal processing unit 26 and detects images such as a face of a main subject or a pet, a flower, and the like in the through image by using technologies disclosed in for example, Japanese Patent Publication No. 2006-270317 and Japanese Patent Publication No. 2007-142525. For example, the presence or absence of an image of the 'face' of the main subject is recognized by considering whether a 'face' pattern image is present in an image by pattern recognition processing or recognized by considering whether a 'flower' pattern is present (step S1).

In next step S2, an image size of a main subject (for example, the 'face' and the 'flower') recognized in step S1 is acquired and a region which has the same size as or a region which is slightly smaller than the image size of the main subject image is set as the AF region.

In next step S3, selection of an AF mode (the phase difference AF mode or the contrast AF mode) depending on the subject size (the image size of the main subject image) acquired in step S2 is performed as described below in FIG. 5.

In next step S4, it is determined whether a shutter release button is pressed and when the shutter release button is not pressed, the process returns to step S1 and when the shutter release button is pressed, the process proceeds to step S5 to perform AE processing and in next step S6, AF processing is performed. The AF processing is performed by the AF mode selected in step S3.

In next step S7, exposure processing of the solid-state imaging device 22a is performed, in step S8, a picked-up image signal is read in the solid-state imaging device 22a, and in step S9, the AFE 22b of FIG. 1 performs AFE processing of the picked-up image signal and thereafter, the A/D converter 22c converts the processed picked-up image signal into a digital signal.

In next step S10, the digital signal processing unit 26 of FIG. 1 performs known image processing of the digital picked-up image signal and the compression/extension processing unit 27 of FIG. 1 image-compresses picked-up image data after image processing into a JPEG format, and the like (step S11), the picked-up image data is recorded in the recording media 32 in step S12, and the process returns to step S1 for next photographing.

Figure 5:
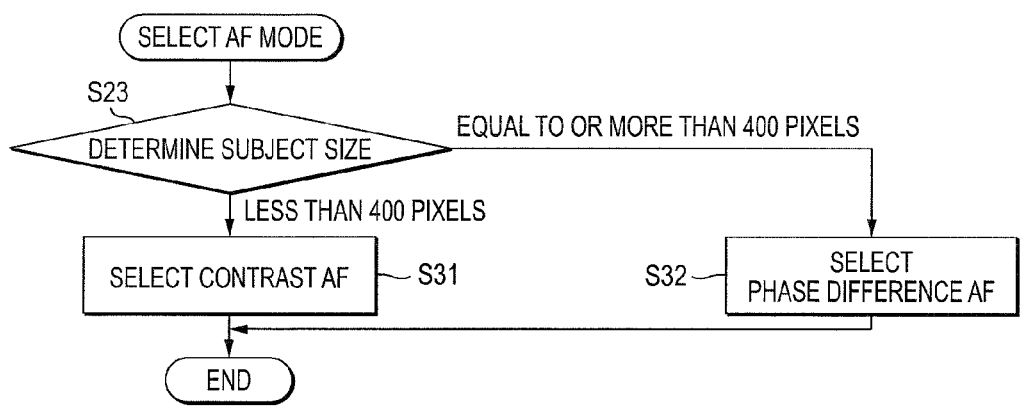
FIG. 5 is a flowchart illustrating an AF mode selection processing sequence according to a first embodiment illustrated in FIG. 4.

FIG. 5 is a flowchart illustrating the AF mode selection processing sequence according to the first embodiment, which is performed in step S3 of FIG. 4. First, in step S23, the subject size (AF region) is determined and it is determined whether a predetermined number of phase difference detection pixels are included in a horizontal size of a subject size imaged on the light receiving surface of the solid-state imaging device.

The phase difference detection pixel is included at a ratio of one pixel per four horizontal pixels, and when 100 phase difference detection pixels are required in order to secure the AF precision, it is determined whether a horizontal direction of the size of the subject imaged on the light receiving surface of the solid-state imaging device is equal to or more than 400 pixels in step S23.

According to a result of the judgment in step S23, in the case where the number of the horizontal pixels of the subject size is less than 400 pixels, when the AF processing is performed by the phase difference AF mode using the detection signal of the phase difference detection pixel 2, required AF precision may not be acquired. As a result, the process proceeds to step S31 to select the contrast AF mode as the AF mode and the processing ends.

According to the result of the judgment in step S23, in the case where the number of the horizontal pixels of the subject size is equal to or more than 400 pixels, the required AF precision may be acquired by the phase difference AF mode using the detection signal of the phase difference detection pixel 2. As a result, the process proceeds to step S32 to select the phase difference AF mode as the AF mode and the processing ends.

Figure 6:
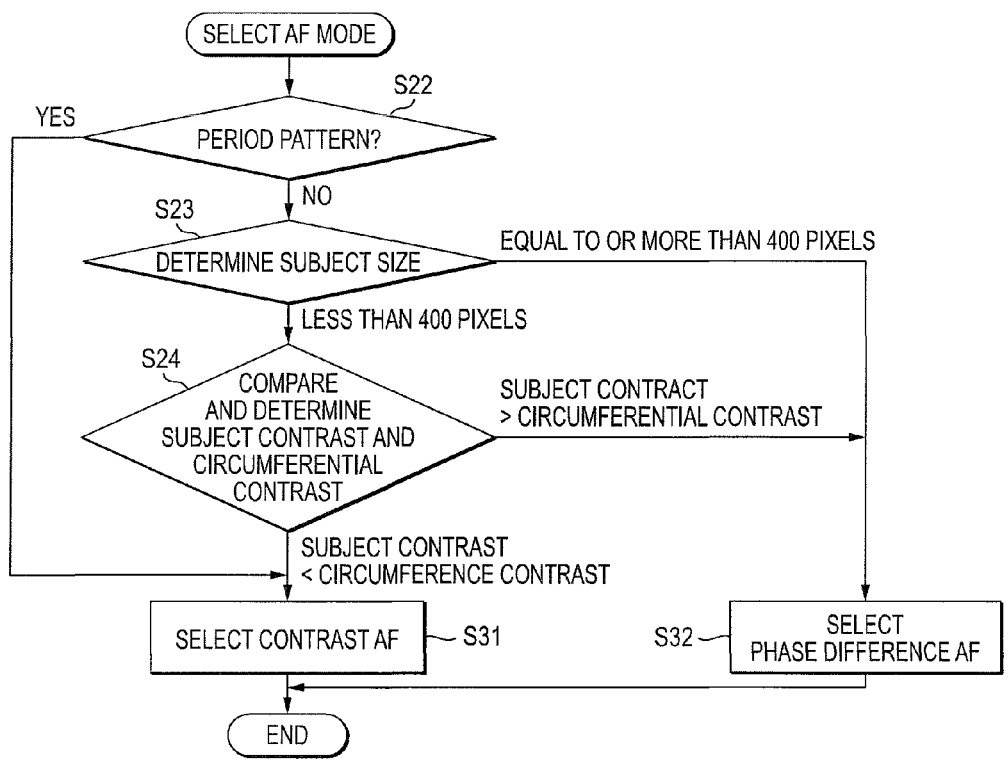
FIG. 6 is a flowchart illustrating an AF mode selection processing sequence according to a second embodiment of the present invention.

FIG. 6 is a flowchart illustrating an AF mode selection processing sequence according to a second embodiment of the present invention. In the embodiment, step S22 is provided before step S23 of FIG. 5. In step S22, it is determined whether the subject in the AF region has a periodic pattern and when the subject has the periodic pattern, the process proceeds to step S31 to select the contrast AF mode. When the subject does not have the periodic pattern, the process proceeds to step S23 from step S22 to determine the subject size as above.

When it is determined that the subject size is less than 400 pixels in step S23, the process proceeds to next step S24, and a contrast of the main subject image and a contrast of a circumferential image (for example, a region excluding the main subject from 400 horizontal pixels and a predetermined range of the number of vertical pixels) of the main subject are compared with each other.

In step S24, when it is determined that the subject contrast>the circumferential contrast, the process proceeds to step S32 to switch the AF region to a region in the range of 400 horizontal pixels and a predetermined number of vertical pixels and select the phase difference AF mode. That is, since the contrast of the main subject image is higher than that of the circumferential pixel even though the size of the main subject image is small, sufficient AF precision may be acquired in spite of performing the phase difference AF mode in the range of 400 horizontal pixels. As a result, the subject applied with the phase difference AF mode is expanded, and as a result, high-speed AF processing becomes available.

When it is determined that the subject contrast<the circumferential contrast, the process proceeds to step S31 to select the contrast AF mode as the AF mode.

Step S22 is added in the aforementioned embodiment, but step S22 is not particularly required in the embodiment. In addition, step S22 may be added to the flowchart of FIG. 5.

Figure 7:
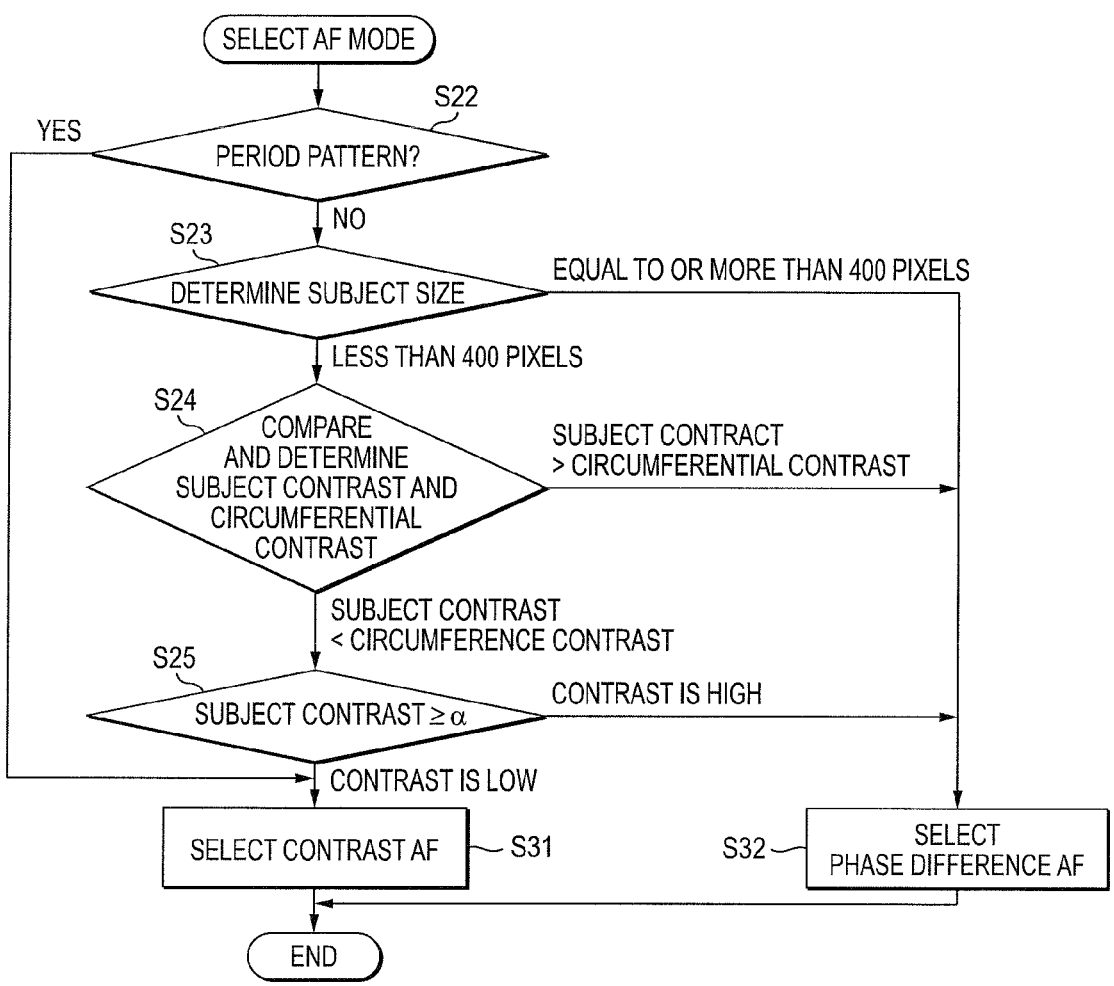
FIG. 7 is a flowchart illustrating an AF mode selection processing sequence according to a third embodiment of the present invention.

FIG. 7 is a flowchart illustrating an AF mode selection processing sequence according to a third embodiment of the present invention. In the embodiment, step S25 is executed after step S24 of FIG. 6. That is, when it is determined that the subject contrast<the circumferential contrast in previous step S24, the process proceeds to step S25 to determine whether the contrast of the main subject image is higher than a predetermined threshold value α.

When the contrast is high, the phase different AF mode is selected even though the size of the main subject image is small (step S32, the AF region in this case is as large as the subject size or slightly smaller than the subject size) and when the contrast is low, the process proceeds to step S31 to select the contrast AF.

When the contrast is high even though the subject size is small, sufficient AF precision may be acquired even though the phase difference AF mode is executed in the small AF region. As a result, the subject applied with the phase difference AF mode is expanded, and as a result, high-speed AF processing becomes available. Further, in the embodiment, steps S22 and S24 may not be performed.

Figure 8:
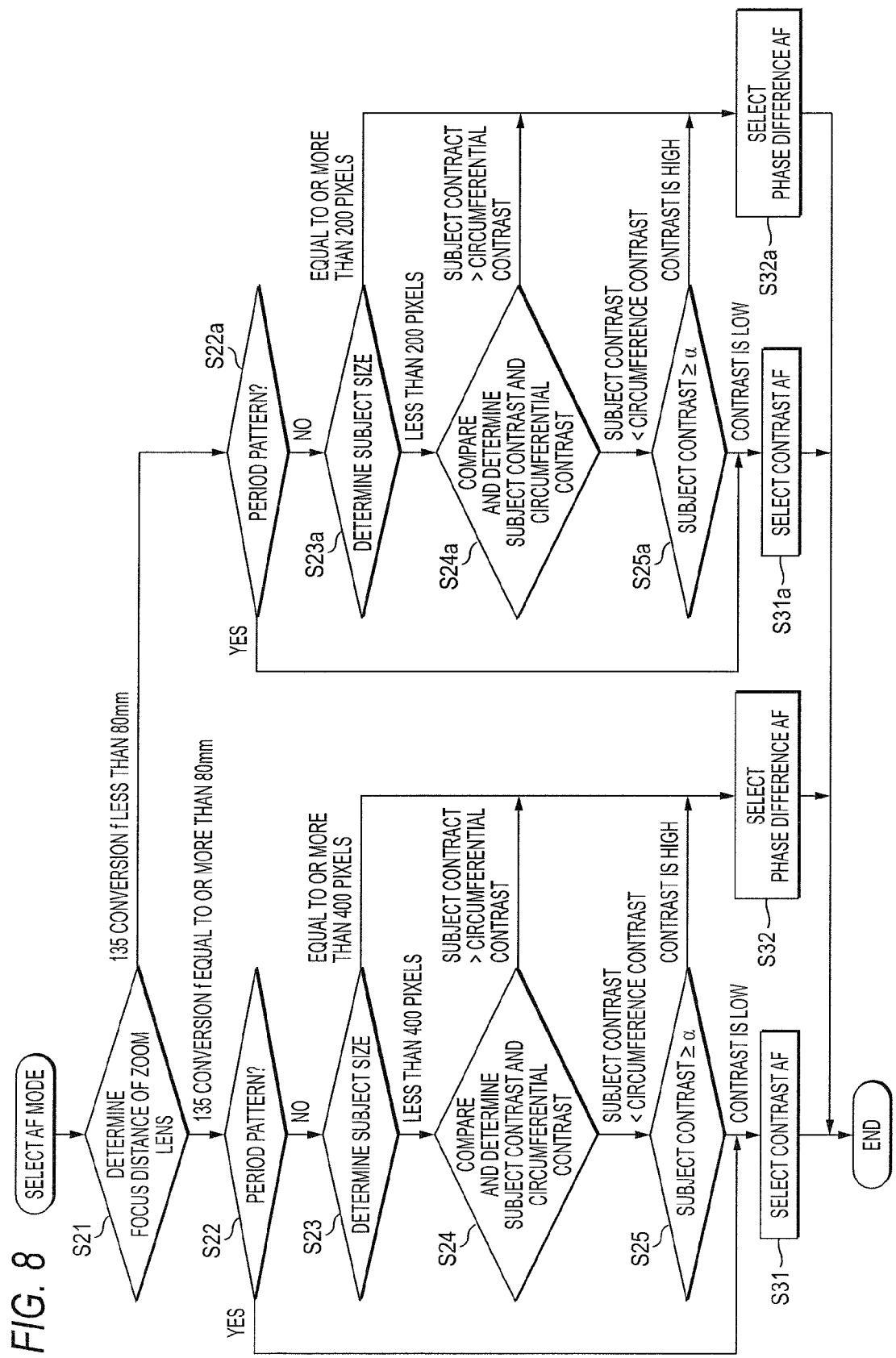
FIG. 8 is a flowchart illustrating an AF mode selection processing sequence according to a fourth embodiment of the present invention.

FIG. 8 is a flowchart illustrating an AF mode selection processing sequence according to a fourth embodiment of the present invention. In the embodiment, since the camera is divided into a camera performing photographing at a telescope side and a camera performing photographing at a wide-angle side, step S21 is provided prior to step S22 in the processing sequence of FIG. 7 and it is determined whether a focus distance of a camera zoom lens is a predetermined distance, for example, 80 mm or more through 135 mm-conversion. In addition, when the focus distance is equal to or more than 80 mm, the process proceeds to step S22 and when the focus distance is less than 80 mm, the process proceeds to step S22a.

Steps S22a, S23a, S24a, S25a, S31a, and S32a below perform the same processing as steps S22, S23, S24, S25, S31, and S32, respectively. However, the threshold value in the judgment of the subject size performed in step S22a is changed. That is, in step S22a, it is determined whether the subject size is equal to or more than 200 pixels in the horizontal direction and further, the AF region when the process proceeds to step S32a from step S24a is set as the range of 200 horizontal pixels. Since other steps S22a to S32a are similar to the description of steps S22 to S32, a duplicated description will be omitted.

Since the subject has a low frequency at the telescope side of the camera, the AF region needs to be broader and since the subject has a high frequency at the wide-angle side of the camera, the AF region may be narrower. By this configuration, it is possible to expand the subject applied with the phase difference AF.

FIG. 2 is a diagram illustrating a phase difference detection pixel array instead of the embodiment of FIG. 2. The pixel array and the color filter array are similar to those of FIG. 2, but the solid-state imaging device 22a of the embodiment is different from that of FIG. 2 in that all of the pixels are set as the phase difference detection pixels. That is, each pixel acquires a picked-up image signal including phase difference information and generates a subject color image from the picked-up image signal, but the phase difference information is also extracted from the pixel.

However, when the phase difference AF processing is performed by extracting the phase difference information, it can be considered that the AF precision is changed depending on the color of a color filter in a case where the phase difference information is extracted from a pixel mounted with the color filter.

Figure 10:
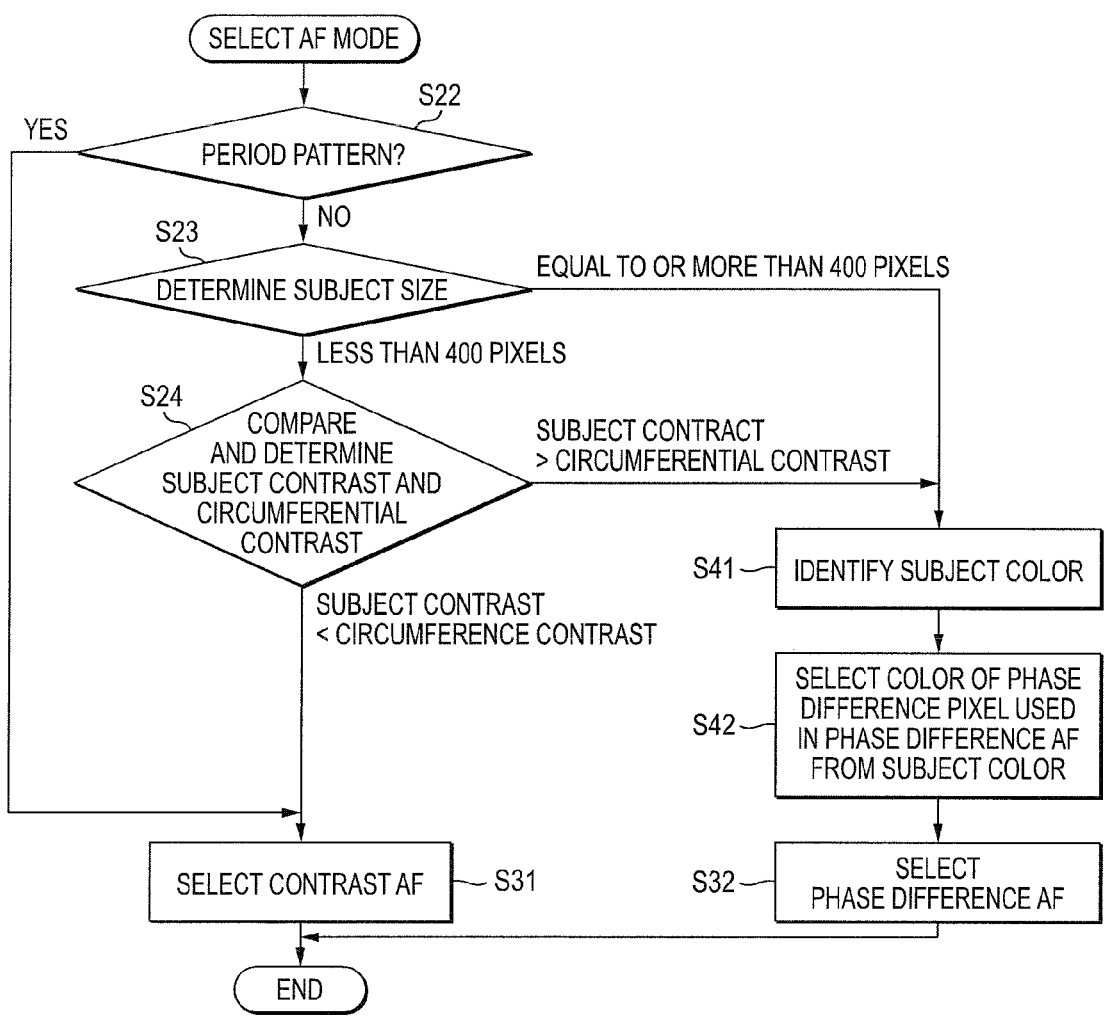
FIG. 10 is a flowchart illustrating an AF mode selection processing sequence according to a fifth embodiment of the present invention.

FIG. 10 is a flowchart illustrating an AF mode selection processing sequence when all of the pixels are set as the phase difference detection pixels. Steps S22, S23, S24, S31, and S32 are the same as the contents of the processing steps described in FIGS. 7 and 8. Further, steps S22 and S24 are not particularly required in the embodiment.

In the embodiment, when the process proceeds to step S32 of selecting a phase difference AF mode according to the judgment result of steps S23 and S24, a color of the subject is first identified in step S41, a used phase difference detection pixel is selected depending on the color of the subject in step S42, and thereafter, the process proceeds to step S32.

That is, when the red R is a primary color of the subject, the phase difference AF mode using the phase difference information detected by the phase difference detection pixel in which red filters are stacked is selected, when the green G is a primary color of the subject, the phase difference AF mode using the phase difference information detected by the phase difference detection pixel in which green filters are stacked is selected, and when the blue B is a primary color of the subject, the phase difference AF mode using the phase difference information detected by the phase difference detection pixel in which blue filters are stacked is selected. As a result, the AF precision is improved.

In FIG. 10, steps S41 and S42 are provided between steps S23 and S24 and step S32. However, steps S41 and S42 may be provided prior to step S22. That is, the color of the subject is identified and thereafter, the phase difference detection pixel is selected, which selects and uses a color among the RGB which is more included in the subject color, and the process proceeds to step S23.

Figure 9:
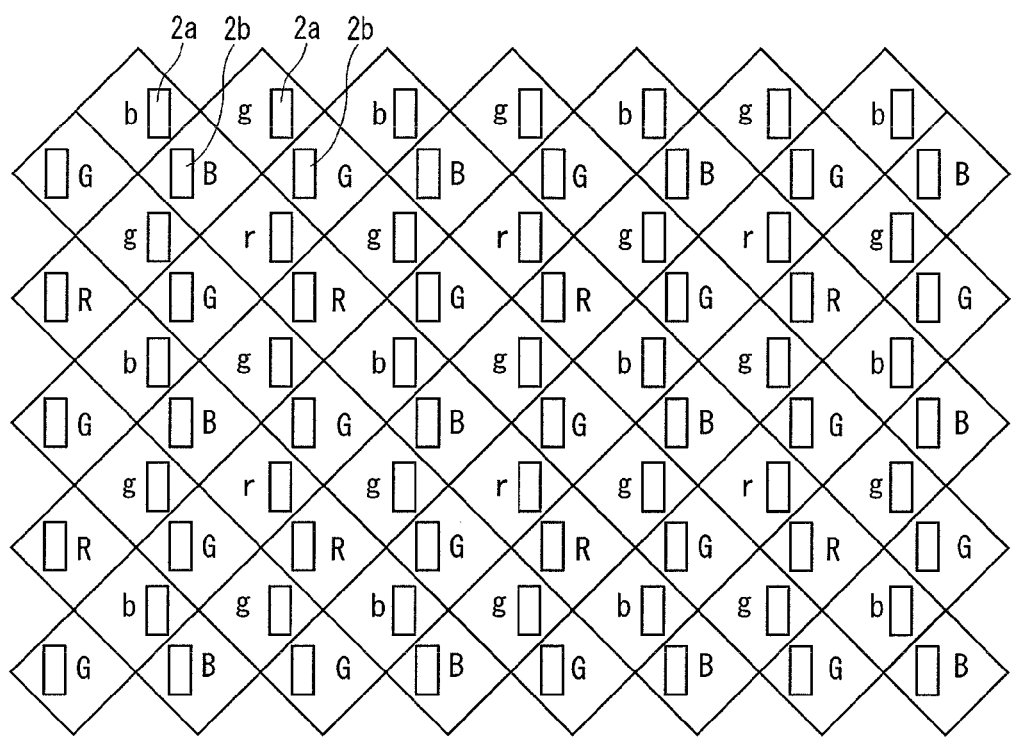
FIG. 9 is a surface schematic view of a solid-state imaging device instead of FIG. 2.

In the color filter array of FIG. 9, the number of pixels of G color pixels is twice the number of pixels of R color pixels or B color pixels. Therefore, when the G color pixel is selected as the phase difference detection pixel and the R color pixel or the B color pixel is selected as the phase difference detection pixel, the threshold number of pixels for judging the subject size may be changed. That is, when the G color pixel is selected, for example, 200 pixels may be set as the judgment threshold value and when the R color pixel or B color pixel is selected, 400 pixels may be set as the judgment threshold value. That is, when the G color pixel is selected, required AF precision may be acquired by the phase difference AF mode even though the subject size is small.

In the embodiment of FIG. 9, steps S21a, S22a, S23a, and the like of FIG. 8 may be further added.

An imaging apparatus and a driving method of the imaging apparatus which comprises a solid-state imaging device having phase difference detection pixels arranged on a light receiving surface of the aforementioned exemplary embodiments, is characterized by comprising: acquiring an image size of a main subject image by identifying the main subject image picked up on the light receiving surface of the solid-state imaging device; setting an AF region subjected to an autofocus processing in accordance with the image size; and selecting a phase difference AF mode when the image size is larger than a required size and select a contrast AF mode when the image size is smaller than the required size, as a mode used for the autofocus processing.

And, the imaging apparatus and the driving method thereof of the aforementioned exemplary embodiments are characterized in that, when the image size is smaller than the required size, a first contrast of the main subject image and a second contrast of a circumferential image of the main subject image are compared with each other, and when the first contrast is higher than the second contrast, the phase difference AF mode is selected and when the first contrast is lower than the second contrast, the contrast AF mode is selected.

And, the imaging apparatus and the driving method thereof of the aforementioned exemplary embodiments are characterized in that, when the image size is smaller than the required size, the contrast of the main subject image is compared with a required threshold value, and when the contrast is higher than the required threshold value, the phase difference AF mode is selected and when the contrast is lower than the required threshold value, the contrast AF mode is selected.

And, the imaging apparatus and the driving method thereof of the aforementioned exemplary embodiments are characterized in that, when a focus distance of a zoom lens is longer than or shorter than a predetermined distance, the required size is changed.

And, the imaging apparatus and the driving method thereof of the aforementioned exemplary embodiments are characterized in that, it is determined whether a period pattern is picked up as the main subject image, and when the period pattern is picked up, the contrast AF mode is selected.

And, the imaging apparatus and the driving method thereof of the aforementioned exemplary embodiments are characterized in that, a phase difference AF mode is selected by identifying a color of the main subject image, and using a phase difference detection pixel having the same-color color filter as the color of the main subject image among the phase difference detection pixels.

According to the aforementioned embodiments, not the main subject but the background can be prevented from being focused by the phase difference AF mode and further, the phase difference AF mode capable of executing high-speed AF processing having high AF-precision with respect to more subjects may be adopted, and as a result, the shutter change will be less lost.

INDUSTRIAL APPLICABILITY

The imaging apparatus according to the present invention can focus the main subject by the phase difference AF mode and widen a range of the subject to adopt the phase difference AF mode, and as a result, it is useful to apply the imaging apparatus to the imaging apparatus such as the digital camera or the camera mounted cellular phone.

Although the present invention has been described in detail with reference to a specific embodiment, it is apparent to those skilled in the art that various changes or modifications can be made without departing from the spirit and the scope of the present invention. This application is based on Japanese Application No. 2011-80898 filed on Mar. 31, 2011 and the entire content thereof is incorporated herein by reference.

REFERENCE SIGNS LIST

1 AF region
2 Phase difference detection pixel
2a, 2b Light blocking layer opening
10 Imaging apparatus
22a Solid-state imaging device
26 Digital signal processing unit
29 System control unit

The invention claimed is:

1. An imaging apparatus, comprising:
a solid-state imaging device in which phase difference detection pixels are formed and arranged on a light receiving surface;
a size identification unit that
acquires a number of pixels of a main subject image in a direction, as an image size of the main subject image, by identifying the main subject image contained in an entire image picked up on the light receiving surface of the solid-state imaging device, and
determines whether the number of pixels of the main subject image in said direction is equal to or larger than a certain number of pixels;
an AF region setting unit that sets an AF region subjected to an autofocus processing in accordance with the image size; and
an AF mode selecting unit that
selects a phase difference AF mode in response to a determination from the size identification unit indicating that the number of pixels of the main subject image in said direction is equal to or larger than said certain number of pixels, and
selects a contrast AF mode in response to a determination from the size identification unit indicating that the number of pixels of the main subject image in said direction is smaller than said certain number of pixels, as a mode used for the autofocus processing.

2. The imaging apparatus of claim 1, wherein when the image size is smaller than a required size determined by said certain number of pixels, a first contrast of the main subject image and a second contrast of a circumferential image of the main subject image are compared with each other, and
when the first contrast is higher than the second contrast, the phase difference AF mode is selected, and
when the first contrast is lower than the second contrast, the contrast AF mode is selected.

3. The imaging apparatus of claim 1, wherein when the image size is smaller than a required size determined by said certain number of pixels, the contrast of the main subject image is compared with a required threshold value, and
when the contrast is higher than the required threshold value, the phase difference AF mode is selected, and
when the contrast is lower than the required threshold value, the contrast AF mode is selected.

4. The imaging apparatus of claim 1, wherein when a focus distance of a zoom lens is longer than or shorter than a predetermined distance, the required size, determined by said certain number of pixels, is changed.

5. The imaging apparatus of claim 1, further comprising:
a period pattern identification unit that determines whether a period pattern is picked up as the main subject image,
wherein in response to the determination indicating that the period pattern is picked up as the main subject image, the contrast AF mode is selected.

6. The imaging apparatus of claim 1, wherein the phase difference AF mode is selected by identifying a color of the main subject image, and using phase difference detection pixels having the same-color color filter as the color of the main subject image among the phase difference detection pixels.

7. A driving method of an imaging apparatus which comprises a solid-state imaging device in which phase difference detection pixels are formed and arranged on a light receiving surface, said driving method comprising:
acquiring a number of pixels of a main subject image in a direction, as an image size of the main subject image, by identifying the main subject image contained in an entire image picked up on the light receiving surface of the solid-state imaging device;
determining whether the number of pixels of the main subject image in said direction is equal to or larger than a certain number of pixels;
setting an AF region subjected to an autofocus processing in accordance with the image size; and
selecting as a mode used for the autofocus processing a phase difference AF mode in response to a determination by said determining step indicating that the number of pixels of the main subject image in said direction is equal to or larger than said certain number of pixels, and selecting as the mode used for the autofocus processing a contrast AF mode in response to a determination by said determining step indicating that the number of pixels of the main subject image in said direction is smaller than said certain number of pixels.

8. The driving method of the imaging apparatus of claim 7, wherein when the image size is smaller than a required size determined by said certain number of pixels, a first contrast of the main subject image and a second contrast of a circumferential image of the main subject image are compared with each other, and when the first contrast is higher than the second contrast, the phase difference AF mode is selected, and when the first contrast is lower than the second contrast, the contrast AF mode is selected.

9. The driving method of the imaging apparatus of claim 7, wherein when the image size is smaller than a required size determined by said certain number of pixels, the contrast of the main subject image is compared with a required threshold value, and when the contrast is higher than the required threshold value, the phase difference AF mode is selected, and when the contrast is lower than the required threshold value, the contrast AF mode is selected.

10. The driving method of the imaging apparatus of claim 7, wherein when a focus distance of a zoom lens is longer than or shorter than a predetermined distance, the required size, determined by said certain number of pixels, is changed.

11. The driving method of the imaging apparatus of claim 7, further comprising:

determining whether a period pattern is picked up as the main subject image, wherein in response to the determination indicating that the period pattern is picked up as the main subject image, the contrast AF mode is selected.

12. The driving method of the imaging apparatus of claim 7, wherein the phase difference AF mode is selected by identifying a color of the main subject image, and using phase difference detection pixels having the same-color color filter as the color of the main subject image among the phase difference detection pixels.

* * * * *